(12) United States Patent
Bellinger et al.

(10) Patent No.: US 7,263,824 B2
(45) Date of Patent: Sep. 4, 2007

(54) EXHAUST GAS AFTERTREATMENT DEVICE FOR AN INTERNAL COMBUSTION ENGINE

(75) Inventors: Steven M. Bellinger, Columbus, IN (US); Thomas M. Yonushonis, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 186 days.

(21) Appl. No.: 11/003,653

(22) Filed: Dec. 3, 2004

(65) Prior Publication Data

US 2006/0117742 A1    Jun. 8, 2006

(51) Int. Cl.
*F01N 3/00* (2006.01)

(52) U.S. Cl. ............... 60/288; 60/280; 60/285; 60/292; 60/297; 60/301; 60/324

(58) Field of Classification Search .......... 60/288, 60/278, 280, 285, 287, 290, 291, 292, 295, 60/297, 301, 324

See application file for complete search history.

(56) References Cited

U.S. PATENT DOCUMENTS

| | | | |
|---|---|---|---|
| 5,410,875 A * | 5/1995 | Tanaka et al. ............ | 60/288 |
| 5,934,072 A * | 8/1999 | Hirota et al. ............ | 60/301 |
| 6,378,298 B2 * | 4/2002 | Harima et al. ............ | 60/288 |
| 6,381,952 B1 | 5/2002 | Asanuma et al. | |
| 6,510,686 B2 | 1/2003 | Kimura et al. | |
| 6,550,718 B2 | 4/2003 | Machara | |
| 6,644,022 B2 | 11/2003 | Hirota et al. | |
| 6,655,133 B2 | 12/2003 | Mikami et al. | |
| 6,679,052 B2 | 1/2004 | Nakatani et al. | |
| 6,708,487 B2 | 3/2004 | Morimoto et al. | |
| 6,742,331 B2 | 6/2004 | Minami | |
| 6,751,949 B2 * | 6/2004 | Tamura et al. ............ | 60/284 |
| 6,820,417 B2 * | 11/2004 | May et al. ............ | 60/297 |
| 6,823,660 B2 * | 11/2004 | Minami ............ | 60/280 |
| 6,823,664 B2 * | 11/2004 | Nakatani et al. ............ | 60/295 |
| 2001/0027647 A1 | 10/2001 | Hirota et al. | |
| 2001/0032458 A1 | 10/2001 | Suzuki et al. | |
| 2002/0152746 A1 | 10/2002 | Mikami et al. | |
| 2002/0157384 A1 | 10/2002 | Hirota et al. | |
| 2002/0170287 A1 | 11/2002 | Hirota et al. | |
| 2003/0066287 A1 | 4/2003 | Hirota et al. | |
| 2003/0106309 A1 | 6/2003 | Morimoto et al. | |
| 2003/0110761 A1 | 6/2003 | Minami | |
| 2003/0121249 A1 | 7/2003 | Foster et al. | |
| 2003/0140621 A1 | 7/2003 | Khair et al. | |
| 2004/0037755 A1 | 2/2004 | Mital et al. | |

\* cited by examiner

*Primary Examiner*—Binh Q. Tran
(74) *Attorney, Agent, or Firm*—Barnes & Thornburg LLP

(57) ABSTRACT

An exhaust gas aftertreatment device for an internal combustion engine comprises an inlet configured to receive the exhaust gas, an outlet from which the exhaust gas exits the device, a first passageway defined between the inlet and the outlet, and a second passageway defined between the inlet and the outlet, wherein the second passageway is separate from the first passageway. A first aftertreatment element is disposed in the first passageway. In one embodiment, the device is a diesel oxidation catalyst device and the second passageway represents a bypass passageway. The second passageway may further have a second aftertreatment element disposed therein. In an alternative embodiment, the device is a NOx aftertreatment element, and a second aftertreatment element is disposed in the second passageway. In either case, the device includes an exhaust gas flow control mechanism configured to selectively control exhaust gas flow through the first and second passageways.

31 Claims, 7 Drawing Sheets

EXHAUST GAS AFTERTREATMENT DEVICE FOR AN INTERNAL COMBUSTION ENGINE

FIELD OF THE INVENTION

The present invention relates generally to exhaust gas aftertreatment devices, and more specifically to structural features of such devices and to techniques for controlling the flow of exhaust gas through such devices.

BACKGROUND

It is generally known to process exhaust gas produced by an internal combustion engine using one or more exhaust gas aftertreatment devices for the purpose of reducing exhaust emissions. It is desirable to selectively control the flow of exhaust gas through one or more such exhaust gas aftertreatment devices in a manner that results in one or more engine operational and/or exhaust aftertreatment benefits.

SUMMARY

The present invention may comprise one or more of the features recited in the attached claims, and/or one or more of the following features and combinations thereof. An exhaust gas aftertreatment device for an internal combustion engine may comprise an inlet configured to receive the exhaust gas, an outlet from which the exhaust gas exits the device, a first passageway defined between the inlet and the outlet and a second passageway defined between the inlet and the outlet, wherein the second passageway is separate from the first passageway. A first aftertreatment element may be disposed in the first passageway.

In one embodiment, the first aftertreatment element defines a flow restriction in the first passageway, and the second passageway defines a bypass passageway devoid of flow restriction. In this embodiment, the exhaust gas aftertreatment device may be a diesel oxidation catalyst device, and the first aftertreatment element may be a diesel oxidation catalyst element.

In an alternative embodiment, a second aftertreatment element may be disposed in the second passageway. In this embodiment, the exhaust gas aftertreatment device may be a NOx aftertreatment device such as a NOx adsorber catalyst or a lean NOx catalyst or an oxidation catalyst device such as a diesel oxidation catalyst. The first aftertreatment element may be a first NOx aftertreatment or oxidation catalyst element and the second aftertreatment element may be a second NOx aftertreatment or oxidation catalyst element. The first NOx aftertreatment or oxidation catalyst element may define a peak NOx or oxidation conversion efficiency in a first range of exhaust gas temperatures, and the second NOx aftertreatment or oxidation catalyst element may define a peak NOx or oxidation conversion efficiency in a second range of exhaust gas temperatures different than the first range of exhaust gas temperatures.

The device may further include an exhaust gas flow control mechanism configured to selectively control exhaust gas flow through the first and second passageways. The exhaust gas flow control mechanism may be controllable to direct exhaust gas flow from the inlet to the first passageway while blocking exhaust gas flow from the inlet to the second passageway. Additionally or alternatively, the exhaust gas flow control mechanism may be controllable to direct exhaust gas flow from the inlet to the second passageway while blocking exhaust gas flow from the inlet to the first passageway. Alternatively or additionally, the exhaust gas flow control mechanism may be controllable to direct exhaust gas flow from the inlet to both of the first and second passageways. Alternatively or additionally, the exhaust gas flow control mechanism is controllable to at least partially block gas flow from the inlet to both of the first and second passageways.

The device may further include a control circuit configured to control operation of the exhaust gas flow control mechanism.

In one embodiment, the device may further include an exhaust brake enabling switch having an on position and an off position, and means for producing an exhaust brake activation parameter, wherein the control circuit is configured to control the exhaust gas flow control mechanism to restrict exhaust gas flow to both of the first and second passageways if the exhaust brake enabling switch is in the on position and the exhaust brake activation parameter indicates that the exhaust brake should be activated. The exhaust brake activation parameter may be a throttle percentage value corresponding to a percentage, relative to a maximum, of requested engine fueling, wherein the throttle percentage value may indicate that the engine brake should be activated if the throttle percentage value corresponds to zero percent requested fueling. The device may further include at least one exhaust brake level switch producing an exhaust brake level signal indicative of a requested level of exhaust braking. The control circuit may be responsive to the exhaust brake level signal to control the operation of the exhaust gas flow control mechanism to produce a corresponding level of exhaust braking.

In an additional or alternative embodiment, the device may further include a service brake including a service brake pedal responsive to operator actuation to apply a braking force to at least one wheel of a vehicle carrying the system, a service brake sensor producing a service brake request level signal indicative of a force applied to the service brake pedal, and a vehicle speed sensor producing a vehicle speed signal indicative of road speed of the vehicle. The control circuit, in this embodiment, may be responsive to the vehicle speed signal to compute a vehicle acceleration value, and to control the exhaust gas flow control mechanism to restrict exhaust gas flow to both of the first and second passageways as a function of the service brake request level signal and the vehicle acceleration value. The device may further include an exhaust brake enabling switch having an on position and an off position. The control circuit may be configured to control the exhaust gas flow control mechanism to restrict exhaust gas flow to both of the first and second passageways only if the exhaust brake enabling switch is in the on position. The device may further include a memory unit having the function stored therein. The function may define a relationship between the service brake request level signal, the vehicle acceleration value and an amount of exhaust gas flow restriction. The amount of exhaust gas flow restriction may increase with decreasing vehicle acceleration values and increasing service brake request levels. The control circuit may be operable to control the exhaust gas flow control mechanism based on the amount of exhaust flow restriction produced by the function. The function may be stored in the memory unit in the form of a table mapping vehicle acceleration values and service brake request level signal values to amounts of exhaust gas flow restriction.

In an additional or alternative embodiment wherein the device is a diesel oxidation catalyst, the device may further include at least one exhaust aftertreatment component receiving exhaust gas exiting the diesel oxidation catalyst device, and means for determining an exhaust gas temperature corresponding to the temperature of exhaust gas entering the inlet of the device. The control circuit may be configured to control the exhaust gas flow control mechanism to restrict exhaust gas flow to both of the first and second passageways if regeneration of the at least one exhaust aftertreatment component is commanded and if the exhaust gas temperature is less than a threshold temperature. The control circuit may be configured to control the exhaust gas flow control mechanism to direct exhaust gas flow from the inlet to the first passageway while blocking exhaust gas flow from the inlet to the second passageway if the exhaust gas temperature is greater than the threshold temperature. The device may further include at least one exhaust aftertreatment component receiving exhaust gas exiting the diesel oxidation catalyst device. The control circuit may be configured to control the exhaust gas flow control mechanism to direct exhaust gas flow from the inlet to the bypass passageway while blocking exhaust gas flow from the inlet to the first passageway if regeneration of the at least one exhaust aftertreatment component is not commanded.

In an additional or alternative embodiment wherein the exhaust gas aftertreatment device is a NOx aftertreatment device, the control circuit may be configured to control the exhaust gas flow control mechanism to direct exhaust gas flow from the inlet to the first passageway while blocking exhaust gas flow from the inlet to the second passageway if regeneration of the NOx aftertreatment device is commanded and if the exhaust gas temperature is closer to the first range of exhaust gas temperatures than to the second range of exhaust gas temperatures. The control circuit may be configured to control the exhaust gas flow control mechanism to direct exhaust gas flow from the inlet to the second passageway while blocking exhaust gas flow from the inlet to the first passageway if regeneration of the NOx aftertreatment device is commanded and if the exhaust gas temperature is closer to the second range of exhaust gas temperatures than to the first range of exhaust gas temperatures. The control circuit may be configured to control the exhaust gas flow control mechanism to direct exhaust gas flow from the inlet to both of the first and second passageways if regeneration of the NOx aftertreatment device is not commanded.

These and other features of the present invention will become more apparent from the following description of the illustrative embodiments.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
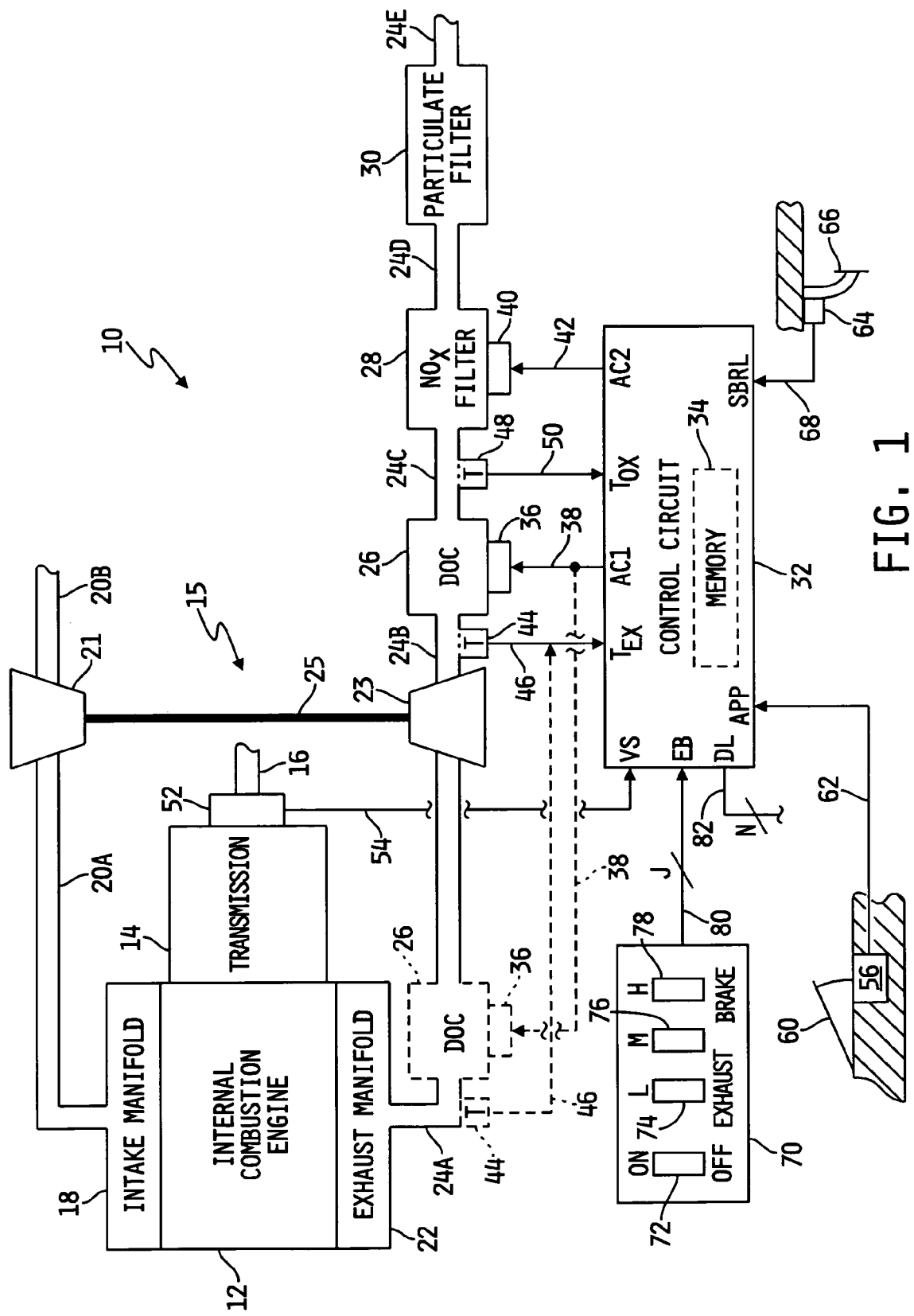
FIG. 1 is a block diagram of a system for controlling operation of one or more exhaust gas aftertreatment devices.

Referring now to FIG. 1, a block diagram of a system 10 for controlling operation of one or more exhaust gas aftertreatment devices is shown. In the illustrated embodiment, the system 10 includes an internal combustion engine 12 operatively coupled to a transmission 14. The engine 12 is operable to rotationally drive a propeller shaft 16 via the transmission 14 in a conventional manner. The engine 12 includes an intake manifold 18 fluidly coupled to an intake conduit 20A for receiving fresh air. An exhaust manifold 22 of the engine 12 is fluidly coupled to an exhaust gas conduit 24A. Exhaust gas produced by the engine 12 exits through the exhaust manifold 22 and exhaust gas conduit 24A in a conventional manner. In the illustrated embodiment, the system 10 further includes a conventional turbocharger 15 having a compressor 21 fluidly coupled to the intake conduit 20A and to another intake conduit 20B. The compressor 21 is mechanically coupled to a turbine 23 via a rotatable drive shaft 25, and the turbine 23 is fluidly coupled to the exhaust gas manifold 24A and also to another exhaust gas manifold 24B. Operation of the turbocharger 15 is conventional in that a turbine wheel (not shown) housed within the turbine 23 is responsive to the flow of exhaust gas through the exhaust gas conduit 24A to rotationally drive the drive shaft 25 and thereby rotate a compressor wheel (not shown) housed within the compressor 21. The rotational speed of the turbine wheel is generally related to the flow rate of exhaust gas through the exhaust gas conduit 24A, and the mass flow rate of fresh air into the intake manifold 18 is, in turn, proportional to the rotational speed of the compressor wheel. Those skilled in the art will recognize that the turbocharger 15 is not essential for operation and control of the one or more exhaust gas aftertreatment devices, as will be described in greater detail hereinafter. Accordingly, the turbocharger 15 will not be included in some embodiments of the system 10, and in such embodiments the intake conduit 20A is directly coupled to the intake conduit 20B, and the exhaust gas conduit 24A is directly coupled to the exhaust gas conduit 24B.

In any case, the exhaust gas conduit 24B is fluidly coupled to an inlet of a diesel oxidation catalyst device 26. An outlet of the diesel oxidation catalyst device 26 is fluidly coupled via an exhaust conduit 24C to an inlet of a NOx aftertreatment device 28 having an outlet fluidly coupled to an exhaust conduit 24D. The exhaust conduit 24D is fluidly coupled to an inlet of a particulate filter 30 having an outlet fluidly coupled to an exhaust conduit 24E. It will be appreciated that in some embodiments of the system 10, the NOx aftertreatment device 28 may not be included, and in such embodiments the exhaust gas conduit 24C is coupled directly to the exhaust conduit 24D.

The system 10 further includes a control circuit 32 having a memory unit 34. The control circuit 32 is, in one exemplary embodiment, microprocessor-based and operable execute a number of software algorithms for controlling various features of the system 10. In an alternative embodiment, the control circuit 32 may be or include any one or more electronic circuits and/or components operable as described hereinafter.

The diesel oxidation catalyst device 26 includes an exhaust gas flow control mechanism, as will be described in greater detail hereinafter, and the system 10 accordingly includes an exhaust gas control mechanism actuator 36 that is electrically connected to an actuator output, AC1, of the control circuit 32 via a signal path 38. The control circuit 32 is operable to control operation of the exhaust gas flow control mechanism included within the diesel oxidation catalyst device 26 by controlling operation of the actuator 38 in a conventional manner. In embodiments including the NOx aftertreatment device 28, the device 28 likewise includes an exhaust gas flow control mechanism, as will be described in greater detail hereinafter, and the system 10 accordingly includes another exhaust gas control mechanism actuator 40 that is electrically connected to an actuator output, AC2, of the control circuit 32 via a signal path 42. The control circuit 32 is operable to control operation of the exhaust gas flow control mechanism included within the NOx aftertreatment device 28 by controlling operation of the actuator 40 in a conventional manner.

The control circuit 32 further includes a number of inputs for receiving sensor-based information and other data relating to the operation of the system 10. For example, the system 10 includes a temperature sensor 44 that is electrically connected to an exhaust temperature input, $T_{ex}$, of the control circuit 32 via a signal path 46. In the illustrated embodiment, the temperature sensor 44 is positioned in fluid communication with the exhaust gas conduit 24B adjacent to the exhaust gas inlet of the diesel oxidation catalyst device 26, although the temperature sensor 44 may alternatively be positioned anywhere along the exhaust gas conduit 24A or in fluid communication with the exhaust manifold 22. In any case, the temperature sensor 44 is operable to produce a temperature signal on signal path 46 that is indicative of the temperature of the exhaust gas flowing thereby, and the control circuit 32 includes one or more software algorithms operable to process this temperature signal and determine therefrom the temperature of exhaust gas entering the diesel oxidation catalyst device 26. In an alternative embodiment, the control circuit 32 may include one or more software algorithms for estimating exhaust gas temperature as a function of a number of engine operating perimeters. An example of one such algorithm for estimating engine exhaust gas temperature is described in U.S. Pat. No. 6,508,242, which is assigned to the assignee of the subject invention, and the disclosure of which is incorporated herein by reference.

In the illustrated embodiment, the diesel oxidation catalyst device 26 (DOC) is shown positioned adjacent to the NOx aftertreatment device 28 so that the outlet of the diesel oxidation catalyst device 26 is adjacent to the inlet of the NOx aftertreatment device 28. In embodiments of the system 10 that do not include the NOx aftertreatment device 28, the diesel oxidation catalyst device 26 may alternatively be positioned so that the outlet of the diesel oxidation catalyst device 26 is adjacent to the inlet of the particulate filter 30. In an alternative embodiment, as shown in phantom in FIG. 1, the diesel oxidation catalyst device 26 (as well as the actuator 36 and temperature sensor 44) may be disposed in-line with the exhaust gas conduit 24A in a so-called "close-coupled" configuration, with the inlet of the diesel oxidation catalyst device 26 positioned adjacent to the outlet of the exhaust manifold 22. In this embodiment, as with the previously described embodiment, the NOx aftertreatment device 28 may or may not be included in the system 10.

The system 10 may further include another temperature sensor 48 that is electrically connected to an exhaust temperature input, $T_{OX}$, of the control circuit 32 via a signal path 50. In the illustrated embodiment, for example, the temperature sensor 48 is positioned in fluid communication with the exhaust gas conduit 24C adjacent to the exhaust gas inlet of the NOx aftertreatment device 28. The temperature sensor 48 is operable to produce a temperature signal on signal path 50 that is indicative of the temperature of the exhaust gas flowing into the inlet of the NOx aftertreatment device 28. In an alternative embodiment, the control circuit 32 may include one or more software algorithms for estimating the temperature, $T_{OX}$, of exhaust gas entering the NOx aftertreatment device 28 as a function of a number of engine operating perimeters.

The control circuit 32 further includes an accelerator pedal position input APP that is electrically connected to an accelerator pedal position sensor 56 via a signal path 62. The accelerator pedal position sensor 56 is operable to produce a position signal on signal path 62 that is indicative of a position or deflection of an accelerator pedal 60 relative to a reference position or deflection.

The control circuit 32 further includes a service brake request level input, SBRL that is electrically connected to a service brake level request sensor 64 via a signal path 68. In one embodiment, the service brake request level sensor 64 is a conventional pressure sensor operable to produce a pressure signal on the signal path 68 that is indicative of pressure, relative to a reference pressure, applied by an operator to a conventional service brake pedal 66. Alternatively, the service brake request level sensor 64 may be a conventional strain sensor or load sensor operable to produce a corresponding signal on signal path 68 that is indicative of the load applied by the operator to the service brake pedal 66. In any case, the service brake request level sensor 64 is operable to produce a signal on signal path 68 that is indicative of the operator-requested level of service brake force, in the form of force applied by the operator to the service brake pedal 66, to be applied to one or more of the wheels (not shown) of a vehicle carrying the system 10. The service brake request level sensor 64 must therefore be capable of distinguishing between various levels (e.g., light, medium or heavy) of service braking force requested by the operator in the form of a force or load applied to the service brake pedal 66. The service brake request level signal produced by the sensor 64 is accordingly indicative to the amount of force or load applied by the operator to the service brake pedal 66.

The control circuit 32 further includes a vehicle speed input VS, that is electrically connected to a vehicle speed sensor 52 via a signal path 54. The vehicle speed sensor 52 is, in the illustrated embodiment, operable to produce a speed signal on signal path 54 that is indicative of the rotational speed of the propeller shaft 16. The control circuit 32, in this embodiment, includes one or more software algorithms operable to process the speed signal on signal path 54 and determine there from a corresponding road speed of the vehicle carrying the system 10. In an alternative embodiment, the system 10 may include one or more wheel speed sensors operable to produce one or more corresponding speed signals indicative of rotational speed of one or more of the vehicle wheels (not shown). In this embodiment, the control circuit 32 includes one or more software algorithms operable to process the one or more wheel speed signals and determine there from the road speed of the vehicle carrying the system 10.

In the illustrated embodiment, the system 10 further includes an exhaust brake panel 70 that will generally be suitably located so that it is accessible by the vehicle operator, such as in the cab area of the vehicle. The exhaust brake panel 70 includes a number of switches including an on/off 72 as well as low, medium and high switches 74, 76 and 78, respectively. The exhaust brake panel 70 is electrically connected to an exhaust brake input EB, of the control circuit 32 via a number, J, of signal paths 80, wherein J may be any positive integer. The statuses of any of the switches 72-78 are provided to the control circuit 32 via signal paths 80. The on/off switch 72 may be selected by the vehicle operator to correspondingly enable or disable operation of an exhaust brake, one embodiment of which will be described in greater detail hereinafter. The L, M and H switches 74-78 respectively, may likewise be selected by the vehicle operator to thereby select low, medium or high exhaust braking forces respectively. Alternatively, the L, M and H switches 74-78 may be replaced by a single; e.g., rotary, switch having L, M and H switch positions. Alternatively or additionally, more or fewer switches or switch positions may be implemented to provide for any desired number of exhaust brake request levels.

The control circuit 32 further includes a data link input/output, DL, that is electrically connected to an N-wire serial data link 82, wherein N may be any positive integer. In one exemplary embodiment, the serial communications link 82 may be a conventional society of automotive engineers (SAE) J-1708 data link configured for communications according to a conventional SAE J-1587 communications protocol. Alternatively, the serial communications link 82 may be a conventional SAE J-1939 data link or other conventional serial communications link configured for communications according to a conventional protocol. In any case, the control circuit 32 is operable to broadcast certain engine-operating perimeters values on the data link 82, as is known in the art. For example, one such engine operating perimeter is throttle percentage (%), wherein throttle % responds to a percentage, relative to 100% of or maximum, fueling supplied to the engine 12. The throttle percentage corresponds, under manual fueling conditions, to the accelerator pedal 60 position or deflection, relative to a reference accelerator pedal position or deflection. The control circuit 32 includes one or more software algorithms for processing the accelerator pedal position signal produced by the sensor 56, and determining therefrom a throttle percentage, or throttle %, under manual fueling conditions. Under automatic fueling conditions, e.g., cruise control or other automatic fueling feature, the throttle % value broadcast on the serial communication link 82 corresponds to a fueling percentage value, relative to 100% or maximum fueling, that may be generated internal or external to the control circuit 32. In either case, the throttle % value represents the currently requested fueling percentage relative to 100% or maximum fueling.

Figure 2A:
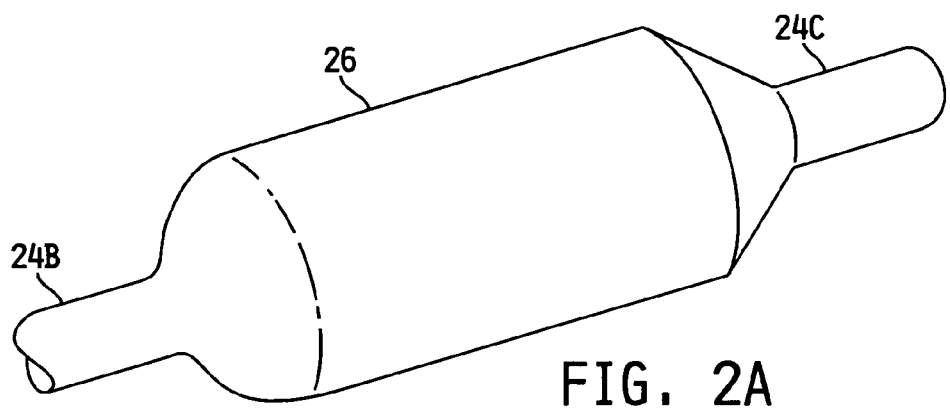
FIG. 2A is a perspective view of the diesel oxidation catalyst device of FIG. 1.
Figure 2B:
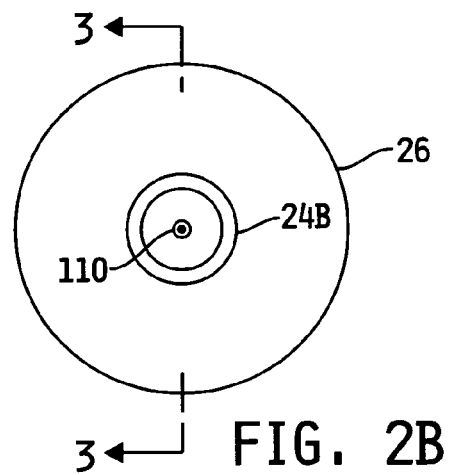
FIG. 2B is an end elevational view of the diesel oxidation catalyst device of FIG. 2A.

Referring now to FIGS. 2A and 2B, perspective and end-elevational views of one embodiment of the diesel oxidation catalyst device 26 of FIG. 1 are shown. In the illustrated embodiment, the diesel oxidation catalyst device 26 is a cylindrical device having an inlet fluidly coupled to the exhaust gas conduit 24B and an outlet fluidly coupled to the exhaust gas conduit 24C. It will be understood, however, that the diesel oxidation catalyst device 26 need not be cylindrically shaped, and may instead have any desired shape.

Figure 3:
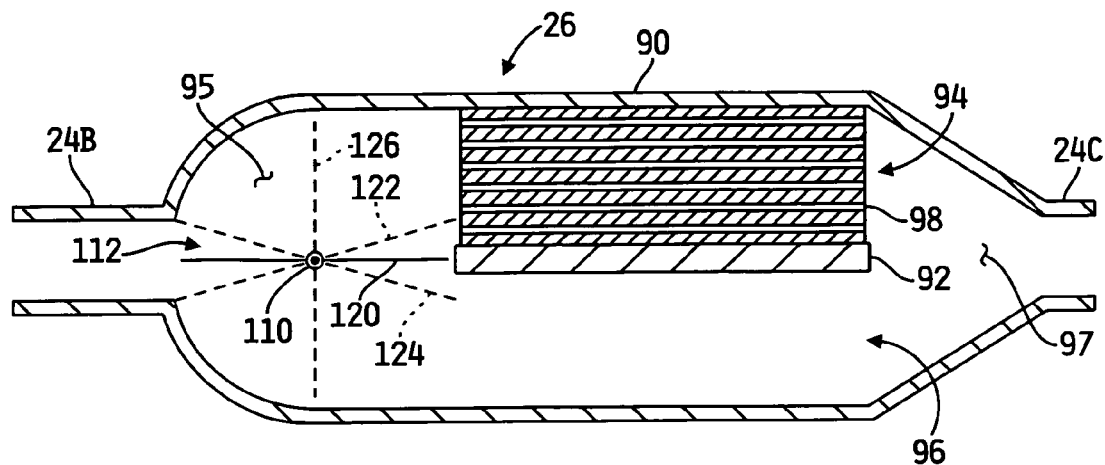
FIG. 3 is a cross-section of the diesel oxidation catalyst of FIGS. 2A and 2B, viewed along section lines 3-3.

Referring now to FIG. 3, a cross section of the diesel oxidation catalyst device 26 of FIGS. 2A and 2B is shown as viewed along section lines 3-3. In the illustrated embodiment, the diesel oxidation catalyst device 26 includes a housing in the form of an outer shell 90 defining a cavity therein. The inlet of the diesel oxidation catalyst device 26, which is fluidly coupled to the exhaust gas conduit 24B, feeds a front chamber 95 that contains an exhaust gas flow control mechanism 112 as briefly described hereinabove. The outlet of the diesel oxidation catalyst device 26, which is fluidly coupled to the exhaust gas conduit 24C, is fluidly coupled to a rear chamber 97. Between the front and rear chambers 95 and 97 respectively, the diesel oxidation catalyst device 26 defines two fluid passageways 94 and 96 separated by a wall member 92. A diesel oxidation catalyst element 98 is disposed in the fluid passageway 94, and the catalyst element 94 extends between the front and rear chambers 95 and 97 respectively.

The diesel oxidation catalyst element 98 is a conventional diesel oxidation catalyst element that defines a number of fluid passageways there through, and is wash-coated in a conventional manner with a suitable catalyst material. The wash-coat reacts with hydrocarbons that are selectively added to the exhaust gas upstream of the diesel oxidation catalyst device 26 to produce an exothermic reaction in a known manner to thereby heat the exhaust gas flowing through the oxidation catalyst to suitable temperature range for regenerating downstream aftertreatment components. Regardless of the number of fluid passageways defined through the diesel oxidation catalyst element 98, the diesel oxidation catalyst element 98 establishes a flow restriction in the fluid passageway 94. In contrast, the fluid passageway 96 is an open passageway and is accordingly devoid of any flow restriction.

The exhaust gas flow control mechanism 112 is configured to selectively control exhaust gas flow through either one or a combination of the fluid passageways 94 and 96, and/or to selectively restrict the flow of exhaust gas through the diesel oxidation catalyst device 26. In the illustrated embodiment, the exhaust gas flow control mechanism 112 is positioned in the front chamber 95, although the exhaust gas flow control mechanism 112 may alternatively be suitably positioned elsewhere within the diesel oxidation catalyst device 26, such as, for example, in the rear chamber 97. The exhaust gas flow control mechanism 112 may generally be implemented using any one or more conventional flow control, flow diverting and/or flow blocking mechanisms or devices. In the illustrated embodiment, for example, the exhaust gas flow control mechanism 112 is implemented as a single conventional butterfly valve positioned within the front chamber 95 and controllable to any desired position about a pivot point 110 via appropriate control of the actuator 36 (FIG. 1).

Although the butterfly valve 112 illustrated in FIG. 3 may be selectively controlled to any desired position about the pivot point 110, a number of example valve positions are illustrated in FIG. 3. For example, the valve position 120 is generally parallel with the wall 92, and in this position the valve 112 presents negligible restriction to the flow of exhaust gas from the inlet of the diesel oxidation catalyst device 26 to either fluid passageway 94 or 96. The valve position 122, in contrast, is configured to direct exhaust gas flow from the inlet of the diesel oxidation catalyst device 26 to the fluid passageway 94 (and through the diesel oxidation catalyst element 98), while blocking the flow of exhaust gas from the inlet of the diesel oxidation catalyst device 26 through the fluid passageway 96. In this position, the valve 112 thus directs all of the exhaust gas flowing into the diesel oxidation catalyst device 26 through the diesel oxidation catalyst element 98. The valve position 122 may be used, for example, when introducing hydrocarbons into the exhaust stream upstream of the diesel oxidation catalyst device 26 to generate temperatures downstream of the diesel oxidation catalyst device 26 that are sufficiently high to regenerate one or more aftertreatment components; e.g., the particulate filter 30. Conversely, the valve position 124 is configured to direct exhaust gas flow from the inlet of the diesel oxidation catalyst device 26 to the fluid passageway 96, while blocking the flow of exhaust gas from the inlet of the diesel oxidation catalyst device 26 through the fluid passageway 94 (thereby blocking the flow of exhaust gas through the diesel oxidation catalyst element 98). In this position, the valve 112 thus directs all of the exhaust gas flowing into the diesel oxidation catalyst device 26 through the unrestricted bypass passage 96. The valve position 124 may be used, for example, to provide unrestricted exhaust gas flow through the diesel oxidation catalyst device 26 when there is no need to elevate exhaust gas temperatures; e.g., when no aftertreatment device downstream of the diesel oxidation catalyst device 26 is being regenerated.

Finally, the example valve position 126 represents a flow restriction to the exhaust gas entering the inlet of the diesel oxidation catalyst device 26. This position may be used, for example, to provide exhaust braking, under specified conditions, to thereby apply a retarding force to the engine 12. As another example, valve positions at or near the valve position 126 may be used under conditions wherein the exhaust gas temperature is lower than desired, such as when the exhaust gas temperature is lower than a minimum temperature required for proper operation of the diesel oxidation catalyst element 98, and it is desirable to increase the temperature of exhaust gas flowing into the diesel oxidation catalyst. Under such conditions, the valve 112 may be moved to, or near, the valve position 126 to restrict exhaust gas flow through the diesel oxidation catalyst device 26. This results in an increase in back pressure and thereby causes the engine 12 to produce more pumping work. As the engine pumping work increases, the amount of fuel consumed by the engine 12 also increases, thereby increasing the temperature of the exhaust gas produced by the engine 12. In embodiments of the system 10 that include a turbocharger 15, restriction of exhaust gas flow through the diesel oxidation catalyst device 26 via control of the valve 112 to the position at or near the valve position 126 also reduces the efficiency of the turbine 23. This, in turn, reduces the mass flow rate of fresh air supplied by the compressor 21 to the intake manifold 18, thereby increasing the temperature of the exhaust gas produced by the engine 12. The temperature of the exhaust gas produced by the engine 12 will thus increase as a result of the combination of increased engine pumping work and decreased fresh air flow rate into the engine 12. By monitoring the temperature of the exhaust gas produced by the engine 12 using any of the techniques described hereinabove, the valve 112 may be suitably controlled by the control circuit 32 at and near the valve position 126 as a function of the exhaust gas temperature to thereby achieve the objective of raising the exhaust gas temperature above a threshold temperature suitable for proper operation of the diesel oxidation catalyst element 98.

It will be appreciated that while a number of specific positions of the exhaust gas flow control mechanism 112 are illustrated and described with respect to FIG. 3, it should be understood that the mechanism 112 may be controlled to positions other than those illustrated to achieve desired exhaust gas flow goals. It will also be appreciated that the exhaust gas flow control mechanism 112 may be implemented in any one or more conventional forms and/or positioned at any one or more desired locations relative to and/or within the diesel oxidation catalyst device 26 to achieve any such goals.

Figure 4A:
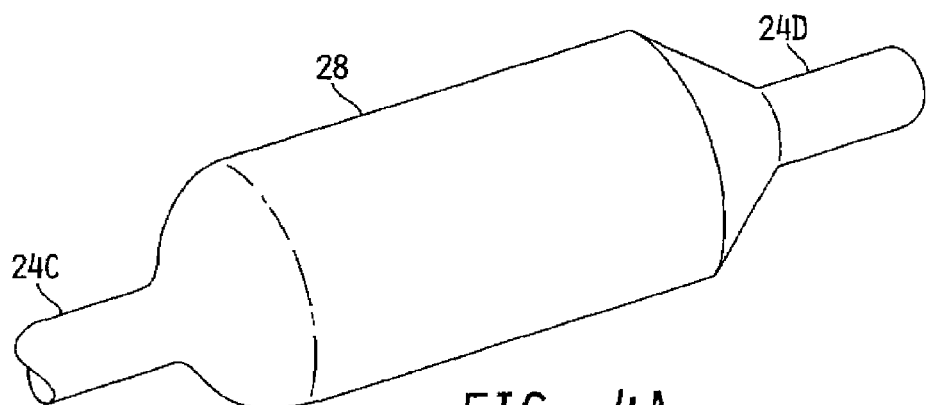
FIG. 4A is a perspective view of the NOx aftertreatment device of FIG. 1.
Figure 4B:
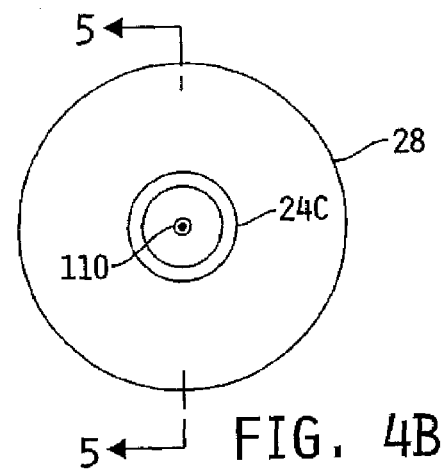
FIG. 4B is an end elevational view of the NOx aftertreatment device of FIG. 4A.

Referring now to FIGS. 4A and 4B, perspective and end-elevational views of one embodiment of the NOx aftertreatment device 28 of FIG. 1 are shown for embodiments of the system 10 that include such a NOx aftertreatment device 28. In the illustrated embodiment, the NOx aftertreatment device 28 is a cylindrical device having an inlet fluidly coupled to the exhaust gas conduit 24C and an outlet fluidly coupled to the exhaust gas conduit 24D. It will be understood, however, that the NOx aftertreatment device 28 need not be cylindrically shaped, and may instead have any desired shape.

Figure 5:
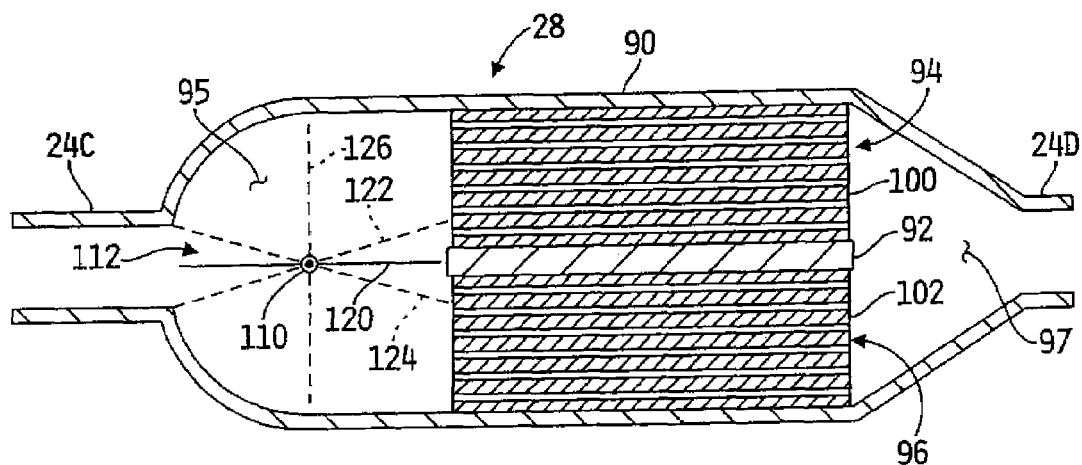
FIG. 5 is a cross-section of the NOx aftertreatment device of FIGS. 4A and 4B, viewed along section lines 5-5.

Referring now to FIG. 5, a cross section of the NOx aftertreatment device 26 of FIGS. 4A and 4B is shown as viewed along section lines 5-5. For illustrative purposes, the NOx aftertreatment device 28 depicted in FIG. 5 is, in many respects, identical to the diesel oxidation catalyst device 26 illustrated in FIG. 3, and like numbers are therefore used to identify like components. For example, the NOx aftertreatment device 28 includes a housing in the form of an outer shell 90 defining a cavity therein. Likewise, the inlet of the NOx aftertreatment device 28, which is fluidly coupled to the exhaust gas conduit 24C, feeds a front chamber 95 that contains an exhaust gas flow control mechanism 112 as described hereinabove, and the outlet of the NOx aftertreatment device 28, which is fluidly coupled to the exhaust gas conduit 24D, is fluidly coupled to a rear chamber 97. Between the front and rear chambers 95 and 97 respectively, the NOx aftertreatment device 28 defines two fluid passageways 94 and 96 separated by a wall member 92. The illustrated NOx aftertreatment device 28 differs from the diesel oxidation catalyst device 26 in that a first NOx aftertreatment element 100 is disposed in the fluid passageway 94, and a second NOx aftertreatment element 102 is disposed in the fluid passageway 96, with both NOx aftertreatment elements 100 and 102 extending between the front and rear chambers 95 and 97 respectively.

The NOx aftertreatment elements 100 and 102 are conventional NOx aftertreatment elements that each define a number of fluid passageways therethrough, and that are each wash-coated in a conventional manner with a suitable NOx trapping material. The two NOx aftertreatment elements 100 and 102 differ in the temperature ranges at which they exhibit peak NOx conversion efficiencies; i.e., temperature ranges at which they most efficiently convert oxides of nitrogen for the purpose of NOx aftertreatment device regeneration.

It is desirable to provide for NOx aftertreatment device regeneration under a wide range of engine load, i.e., engine fueling, conditions. However, the temperature of exhaust gas produced by the engine 12 generally varies as a function of engine load such that higher exhaust gas temperatures result under full load (e.g., also known as maximum or 100%) fueling than under lesser load fueling conditions. Accordingly, the elevated exhaust temperatures produced by the diesel oxidation catalyst device 26, or other conventional diesel oxidation catalyst device in embodiments of the system 10 that include only a conventional diesel oxidation catalyst device, are likewise higher under full engine load conditions than under lesser engine load conditions. To provide for NOx aftertreatment device regeneration under a wide range of engine load conditions, suitable wash-coat compositions are chosen and applied to the two NOx aftertreatment elements 100 and 102 so that the temperature range at which one of the NOx aftertreatment elements, e.g., NOx aftertreatment element 100, exhibits peak NOx conversion efficiency corresponds to exhaust gas temperatures produced by a diesel oxidation catalyst device under a high range of engine load (high engine fueling) conditions, and the temperature range at which the other of the NOx aftertreatment elements, e.g., NOx aftertreatment element 102, exhibits peak NOx conversion efficiency corresponds to exhaust temperatures produced by a diesel oxidation catalyst device under a low range of engine load (low engine fueling) conditions.

As described hereinabove with respect to the diesel oxidation catalyst device 26, the exhaust gas flow control mechanism 112 carried by the NOx aftertreatment device 28 is configured to selectively control exhaust gas flow through either one or a combination of the fluid passageways 94 and 96, and/or to selectively restrict the flow of exhaust gas through the NOx aftertreatment device 28. In the illustrated embodiment, the exhaust gas flow control mechanism 112 is positioned in the front chamber 95, although the exhaust gas flow control mechanism 112 may alternatively be suitably positioned elsewhere within the NOx aftertreatment device 28, such as, for example, in the rear chamber 97. The exhaust gas flow control mechanism 112 may generally be implemented using any one or more conventional flow control, flow diverting and/or flow blocking mechanisms or devices. In the illustrated embodiment, for example, the exhaust gas flow control mechanism 112 is implemented as a single conventional butterfly valve positioned within the front chamber 95 and controllable to any desired position about a pivot point 110 via appropriate control of the actuator 40 (FIG. 1).

Although the butterfly valve 112 illustrated in FIG. 5 may be selectively controlled to any desired position about the pivot point 110, a number of example valve positions are illustrated in FIG. 5. For example, the valve position 120 is generally parallel with the wall 92, and in this position the valve 112 presents negligible restriction to the flow of exhaust gas from the inlet of the NOx aftertreatment device 28 to either fluid passageway 94 or 96. The valve position 122, in contrast, is configured to direct exhaust gas flow from the inlet of the NOx aftertreatment device 28 to the fluid passageway 94 (and through the NOx aftertreatment element 100), while blocking the flow of exhaust gas from the inlet of the NOx aftertreatment device 28 through the fluid passageway 96 (and through the NOx aftertreatment element 102). In this position, the valve 112 thus directs all of the exhaust gas flowing into the NOx aftertreatment device 28 through the NOx aftertreatment element 100. The valve position 122 may be used, for example, when the temperature of the exhaust gas entering the NOx aftertreatment device 28 is within or near the range of temperatures at which the NOx aftertreatment element 100 has peak NOx conversion efficiency. Conversely, the valve position 124 is configured to direct exhaust gas flow from the inlet of the NOx aftertreatment device 28 to the fluid passageway 96 (and through the NOx aftertreatment element 102), while blocking the flow of exhaust gas from the inlet of the NOx aftertreatment device 28 through the fluid passageway 94 (and through the NOx aftertreatment element 102). In this position, the valve 112 thus directs all of the exhaust gas flowing into the NOx aftertreatment device 28 through the NOx aftertreatment element 102. The valve position 124 may be used, for example, when the temperature of the exhaust gas entering the NOx aftertreatment device 28 is within or near the range of temperatures at which the NOx aftertreatment element 102 has peak NOx conversion efficiency.

Finally, the example valve position 126 represents a flow restriction to the exhaust gas entering the inlet of the NOx aftertreatment device 26. This position may be used, for example, to provide exhaust braking, under specified conditions as described hereinabove with respect to the diesel oxidation catalyst device 26, to thereby apply a retarding force to the engine 12 in embodiments that include only a conventional diesel oxidation catalyst device, or to provide a redundant or back-up exhaust braking function in embodiments that include the diesel oxidation catalyst device 26 described herein.

Figure 6:
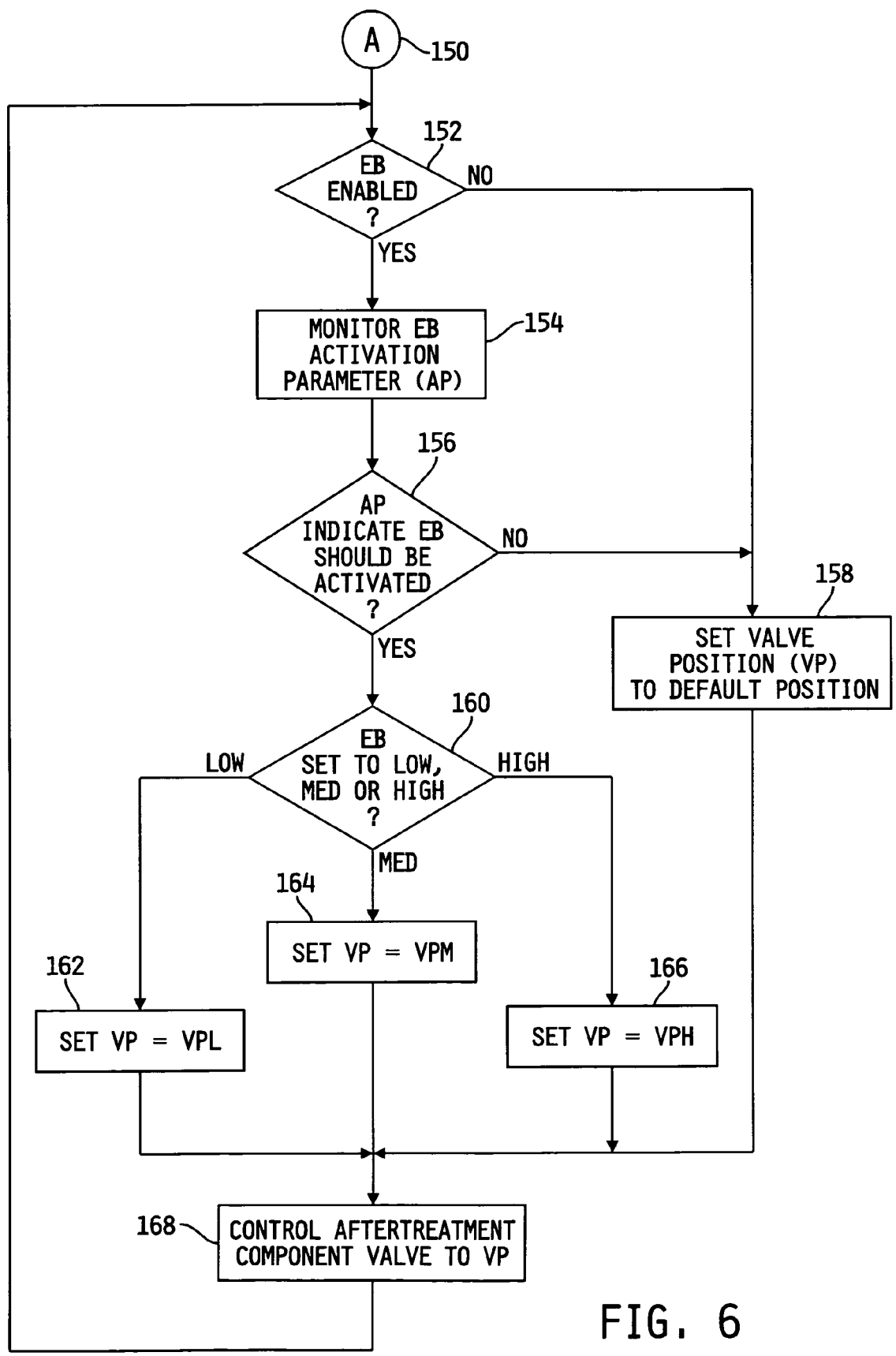
FIG. 6 is a flowchart of one illustrative software algorithm for controlling operation of either of the exhaust gas aftertreatment devices of FIG. 1.

It will be appreciated that while a number of specific positions of the exhaust gas flow control mechanism 112 are illustrated and described with respect to FIG. 5, it should be understood that the mechanism 112 may be controlled to positions other than those illustrated to achieve desired exhaust gas flow goals. It will also be appreciated that the exhaust gas flow control mechanism 112 may be implemented in any one or more conventional forms and/or positioned at any one or more desired locations relative to and/or within the diesel oxidation catalyst device 26 to achieve any such goals Referring now to FIG. 6, a flow chart is shown of one illustrative software algorithm 150, for controlling operation of either of the diesel oxidation catalyst device 26 and the NOx aftertreatment device 28 of FIGS. 1-5. The algorithm 150 sets forth a process for controlling an exhaust gas aftertreatment device in a manner that provides for exhaust braking, as described briefly hereinabove, and in this sense the algorithm 150 is applicable to control operation of the diesel oxidation catalyst device 26 in embodiments of the system 10 that may or may not include a NOx aftertreatment device such as the NOx aftertreatment device 28, and/or to control operation of the NOx aftertreatment device 28 in embodiments of the system 10 that include a conventional diesel oxidation catalyst or the diesel oxidation catalyst device 26. In any case, the algorithm 150 is stored in the memory unit 34 in the form of the conventional programming code, and is executed by the control circuit 32. The algorithm 150 begins at step 152 where the control circuit 152 is operable to determine whether the exhaust brake is enabled. In the illustrated embodiment, the control circuit 32 is operable to execute step 152 by monitoring the status of the on/off switch 72 of the exhaust brake panel 70. If the on/off switch 72 is in the "on" position, the exhaust brake is enabled, and if the on/off switch 72 is in the "off" position, the exhaust brake is disabled. If the control circuit 32 determines at step 152 that the exhaust brake is enabled, algorithm execution advances to step 154 where the control circuit 32 is operable to monitor an exhaust brake activation parameter (AP). In an exemplary embodiment, the exhaust brake activation perimeter is throttle percentage (%) as this term is described hereinabove. Those skilled in the art will recognize that other exhaust brake activation parameters may alternatively or additionally be used, examples of which include, but are not limited to a signal or value indicative of activation of the service brake, a signal or value indicative of the transmission 14 being out-of-gear, and the like. In the exemplary embodiment, the control circuit 32 is operable to determine that the exhaust brake should be activated if the throttle % value is equal to zero, or otherwise indicative of zero fueling conditions. If the control circuit 32 determines at step 156 that the exhaust brake should be activated, algorithm execution advances to step 160. From the "no" branches of steps 156 and 152, algorithm execution advances to step 158 where the control circuit 32 is operable to set a valve position value (VP) to a default valve position. As used herein, the term "default valve position" is defined as any position that the valve or other exhaust gas flow control mechanism 112 of either or both of the diesel oxidation catalyst device 26 and the NOx aftertreatment device 28 would be in the absence of the algorithm 150.

At step 160, the control circuit 32 has determined that the exhaust brake is enabled and should be activated, and is then operable at step 160 to determine whether the exhaust brake level is set to low, medium or high by monitoring the status of the switches 74, 76 and 78, respectively. If the exhaust brake is set to low, execution of the algorithm 150 advances to step 162 where the control circuit 32 is operable to set the valve position value, VP, to a low braking force valve position, PL. If, at step 160, the control circuit 32 determines that the exhaust brake is set to medium, algorithm execution advances to step 164 where the control circuit 32 is operable to set the valve position value, VP, to a medium braking force valve position, VPM. Finally, if the control circuit 32 determines at step 160 that the exhaust brake is set to high, algorithm execution advances to step 166 where the control circuit 32 is operable to set the valve position value, VP, to a high braking force valve position, VPH. Generally, VPL, VPM and VPH will correspond to the valve position at or near 126 as shown in FIGS. 3 and 5 to thereby apply a corresponding braking force to the engine 12 as described hereinabove. In any case, execution of the algorithm 150 advances from any of the steps 158, 162, 164 and 166 to step 168 where the control circuit 32 is operable to control valve or other exhaust gas flow control mechanism 112 of either or both of the diesel oxidation catalyst device 26 and the NOx aftertreatment device 28 to VP via the actuator 36 or 40 respectively, while monitoring the position of the actuator 36 or 40 in a conventional manner. Execution of the algorithm 150 loops from step 168 back to step 152 for continual execution of the algorithm 150.

From the foregoing, it should be apparent that the algorithm 150 is directed to controlling the exhaust gas flow mechanism of either or both of the diesel oxidation catalyst device 26 and the NOx aftertreatment device 28 to provide for exhaust braking under specified conditions according to user's selection of the various exhaust brake switches 72-78.

Figure 7:
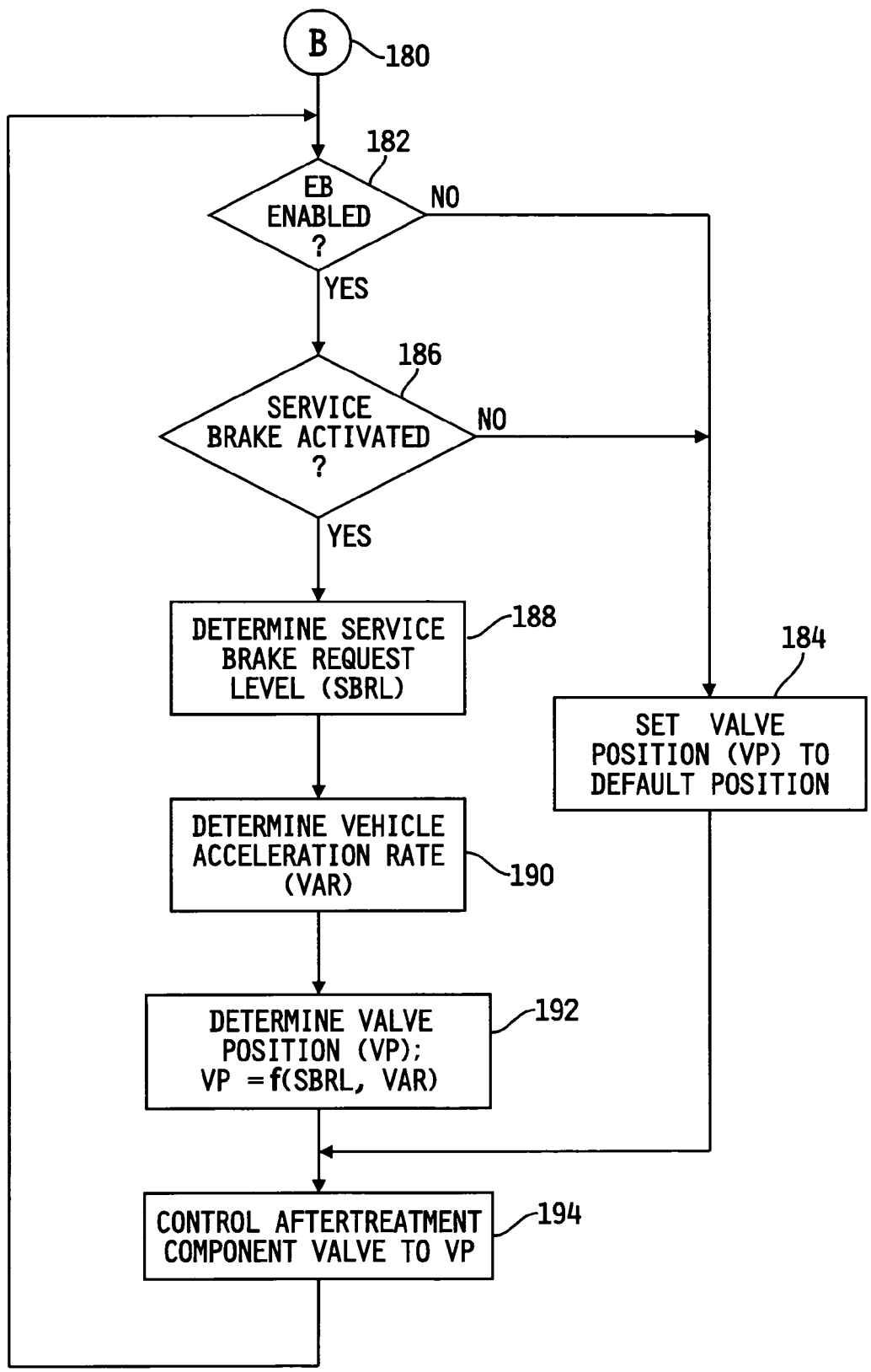
FIG. 7 is a flowchart of another illustrative software algorithm for controlling operation of either of the exhaust gas aftertreatment devices of FIG. 1.

Referring now to FIG. 7, a flow chart is shown of another illustrative software algorithm 180 for controlling operation of either of the diesel oxidation catalyst device 26 and the NOx aftertreatment device 28 of FIGS. 1-5. As with the algorithm 150 of FIG. 6, the algorithm 180 sets forth a process for controlling an exhaust gas aftertreatment device in a manner that provides for exhaust braking, as described briefly hereinabove, and in this sense the algorithm 180 is applicable to control operation of the diesel oxidation catalyst device 26 in embodiments of the system 10 that may or may not include a NOx aftertreatment device such as the NOx aftertreatment device 28, and/or to control operation of the NOx aftertreatment device 28 in embodiments of the system 10 that include a conventional diesel oxidation catalyst or the diesel oxidation catalyst device 26. In any case, the algorithm 180 is stored in the memory unit 34 in the form of the conventional programming code, and is executed by the control circuit 32. The algorithm 180 begins at step 182 where the control circuit 32 is operable to determine whether the exhaust brake is enabled as described hereinabove with respect to step 152 of algorithm 150. If so, algorithm execution advances to step 186 where the control circuit 32 is operable to determine whether the service brake 66 has been activated. In the illustrated embodiment, the control circuit 32 is operable to determine whether the service brake 66 has been activated by monitoring the output of the service brake request level sensor 64. Alternatively, the system 10 may further include a service brake switch (not shown) operable to switch states when the service brake 66 is activated by the vehicle operator. In any case, if the control circuit 32 determines at step 186 that the service brake 66 has not been activated or at step 182 that the exhaust brake is not enabled, algorithm execution advances to step 184 where the control circuit 32 is operable to set the valve position value (VP) to a default valve position, wherein the term "default valve position" is defined for purposes of this document as the position that the valve or other exhaust gas flow control mechanism 112 of either or both of the diesel oxidation catalyst device 26 and the NOx aftertreatment device 28 would assume absent the algorithm 180.

If the control circuit 32 determines at steps 182 and 186 that the exhaust brake is enabled and that the service brake 66 has been activated, algorithm execution advances to step 188 where the control circuit 32 is operable to determine the service brake request level (SBRL) by monitoring the output of the service brake request level sensor 64 as described hereinabove. Thereafter at step 190, the control circuit 32 is operable to determine a vehicle acceleration rate (VAR), such as by differentiating the vehicle speed signal produced by the vehicle speed sensor 52. Thereafter at step 192, the control circuit 32 is operable to determine a valve position value, VP, as a function of the service brake request level, SBRL, and the vehicle acceleration rate, VAR. The functional relationship between SBRL, VAR and VP may be implemented in the form of one or more equations, graphs, charts or the like, and in one specific embodiment this functional relationship is implemented in the form of a table mapping values of SBRL and VAR to VP values. Generally, if the vehicle is decelerating at a low rate and the force or load applied by the vehicle operator to the service brake pedal 66 is low, this is an indication that the vehicle is being adequately slowed via controlled operation of the service brake 66. Under these conditions, little or no supplemental exhaust braking force will typically be required, and the table is populated for such conditions accordingly. However, as the rate of vehicle deceleration increases and/or the force or load applied by the vehicle operator to the service brake pedal 66 increases, such conditions are indicative of a less controlled stop, and at some point become indicative of a panic stop, and under such cases it is desirable to supplement the braking force of the service brake 66 with exhaust braking as described hereinabove. Thus, the table is generally populated with increasing exhaust gas flow restriction values, corresponding to increased exhaust braking force, with decreasing vehicle acceleration values (i.e., increasing deceleration values) and increasing service brake request levels. In any case, algorithm execution advances from step 192 to step 194 where the control circuit 32 is operable to control the valve or other exhaust gas flow control mechanism 112 of either or both of the diesel oxidation catalyst device 26 and the NOx aftertreatment device 28 to the valve position value, VP. From step 194, execution of the algorithm 180 loops back to step 182 for continual execution of the algorithm 180.

From the foregoing, it should be apparent that the control circuit 32 is operable under the direction of the software algorithm 180 to control the exhaust braking force as a function of the vehicle acceleration rate and of the force or load applied by the vehicle operator to the service brake pedal 66 to thereby provide supplemental braking force under appropriate service braking conditions.

Figure 8:
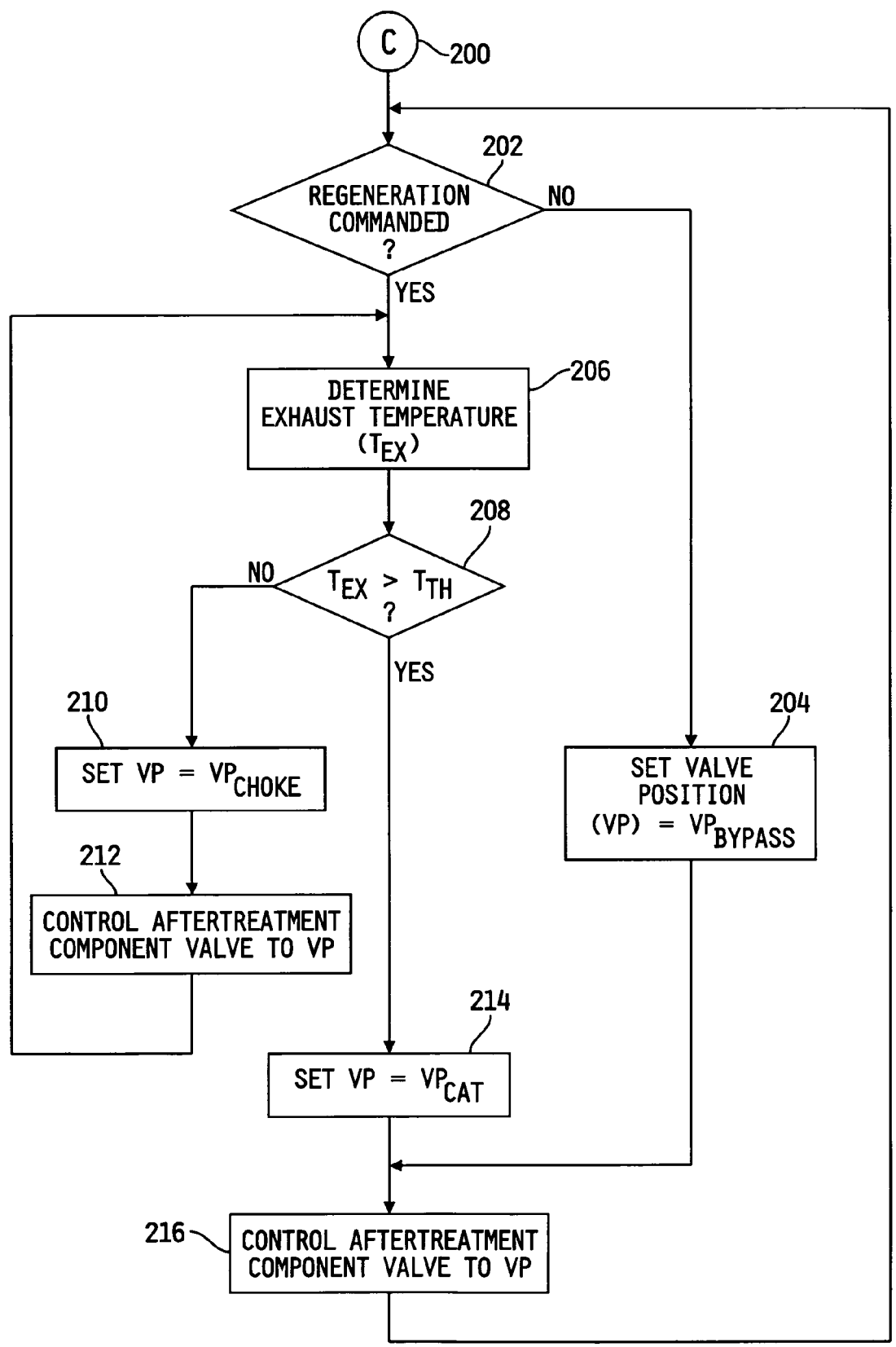
FIG. 8 is a flowchart of one illustrative software algorithm for controlling operation of the diesel oxidation catalyst device of FIG. 1.

Referring now to FIG. 8, a flow chart is shown of one illustrative software algorithm 200 for controlling operation of the diesel oxidation catalyst device 26 of FIGS. 1-3. The algorithm 200 sets forth a process for controlling the diesel oxidation catalyst device 26 in a manner that provides for selective bypassing of the diesel oxidation catalyst element 98, and in this sense the algorithm 200 is applicable to control operation of the diesel oxidation catalyst device 26 in embodiments of the system 10 that may or may not include a NOx aftertreatment device such as the NOx aftertreatment device 28. The software algorithm 200 is stored in the memory unit 34 in the form of one or more conventional software programs and is executed by the control circuit 32 in a conventional manner. The algorithm 200 begins as step 202 where the control circuit 32 is operable to determine whether regeneration of one or more aftertreatment components downstream of the diesel oxidation catalyst device 26 has been commanded. In one embodiment, the control circuit 32 is operable to control the regeneration times of downstream aftertreatment components, and therefore has knowledge of whether regeneration has been commanded for any one or more downstream aftertreatment components. If the control circuit 32 determines at step 202 that the regeneration of one or more aftertreatment components downstream of the diesel oxidation catalyst device 26 has not been commanded, algorithm execution advances to step 204 wherein the control circuit 32 is operable to set the valve position value, VP, to a catalyst bypass position, $VP_{BYPASS}$. In the embodiment illustrated in FIG. 3, the $VP_{BYPASS}$ valve position corresponds to the valve position 124. In any case, the catalyst valve position $VP_{BYPASS}$ corresponds to a position of the valve or other exhaust gas flow control mechanism 112 of the diesel oxidation catalyst device 26 that directs exhaust gas flowing into the inlet of the diesel oxidation catalyst device 26 to the outlet of the diesel oxidation catalyst device 26 via the fluid passageway 96 while blocking exhaust gas flow from the inlet of the diesel oxidation catalyst device 26 to the outlet of the diesel oxidation catalyst device 26 via the fluid passageway 94. With the valve or other exhaust gas flow control mechanism 112 In this position, exhaust gas accordingly does not flow through the diesel oxidation catalyst element 98, and instead flows through the less restrictive bypass passageway 96.

If, at step 202, the control circuit 32 determines that regeneration of one or more of the aftertreatment components downstream of the diesel oxidation catalyst device 26 has been commanded, execution of the algorithm 200 advances to step 206 where the control circuit 32 is operable to determine the temperature, $T_{EX}$, of the exhaust gas flowing into the inlet of the diesel oxidation catalyst device 26 using any one or more of the techniques described hereinabove. Thereafter at step 208, the control circuit 32 is operable to determine whether $T_{EX}$ is greater than a threshold temperature $T_{TH}$. As described hereinabove, the diesel oxidation catalyst element 98 requires a sufficiently high exhaust gas temperature for proper operation thereof when hydrocarbons are introduced into the exhaust stream upstream of the diesel oxidation catalyst element 98. The threshold temperature, $T_{TH}$, is therefore selected to be a temperature above which satisfies this requirement. Thus, if the control circuit 32 determines at step 208 that $T_{EX}$ is not greater than $T_{TH}$, then the exhaust gas temperature is not sufficiently high to allow for proper operation of the diesel oxidation catalyst element 98, and the exhaust gas temperature must therefore be increased. In this case, algorithm execution advances to step 210 where the control circuit 32 is operable to set the valve position value, VP, to an exhaust gas flow restriction or choke position, $VP_{CHOKE}$. In the embodiment illustrated in FIG. 3, the $VP_{CHOKE}$ position is at or near the position 126 of the catalyst valve or other exhaust flow control mechanism 112, to thereby cause the temperature of the exhaust gas entering the diesel oxidation catalyst device 26 to increase as described hereinabove. Thereafter at step 212, control circuit 32 is operable to control the valve or other exhaust gas flow mechanism 112 within the diesel oxidation catalyst device 26 to VP. From step 212, algorithm execution loops back to step 206 to monitor the temperature of the exhaust gas entering the inlet of the diesel oxidation catalyst device 26. When the control circuit 32 determines at step 208 that the exhaust gas temperature, $T_{EX}$, is, or has risen, above $T_{TH}$, algorithm execution advances to step 214 where the control circuit 32 is operable to set the valve position value, VP, to a catalyst position, $VP_{CAT}$. In the embodiment illustrated in FIG. 3, the $VP_{CAT}$ valve position corresponds to the valve position 122. In any case, the catalyst valve position $VP_{CAT}$ corresponds to a position of the valve or other exhaust gas flow control mechanism 112 of the diesel oxidation catalyst device 26 that directs exhaust gas flowing into the inlet of the diesel oxidation catalyst device 26 to the outlet of the diesel oxidation catalyst device 26 via the fluid passageway 96 (and through the diesel oxidation catalyst element 98) while blocking exhaust gas flow from the inlet of the diesel oxidation catalyst device 26 to the outlet of the diesel oxidation catalyst device 26 via the fluid passageway 94. With the valve or other exhaust gas flow control mechanism 112 In this position, exhaust gas accordingly does not flow through the bypass passageway 96 and instead flows through the diesel oxidation catalyst element 98.

Following either of steps 204 and 214, execution of the algorithm 200 advances to step 216 where the control circuit 32 is operable to control the valve or other exhaust gas flow control mechanism 112 of the diesel oxidation catalyst device 26 to VP. Thereafter, algorithm execution loops back to step 202 for continual execution of the algorithm 200.

From the foregoing, it should be apparent that the control circuit 32 is operable under the direction of the software algorithm 200 to bypass the diesel oxidation catalyst element 98 by directing the flow of exhaust gas through the fluid passageway 96 of the diesel oxidation catalyst device 26 when regeneration of one or more aftertreatment components downstream of the diesel oxidation catalyst device 26 is not commanded, and to otherwise direct the flow of exhaust gas through the diesel oxidation catalyst element 98 after insuring that the exhaust gas entering the inlet of the diesel oxidation catalyst device 26 is above a threshold temperature required for proper operation of the diesel oxidation catalyst element 98.

Figure 9:
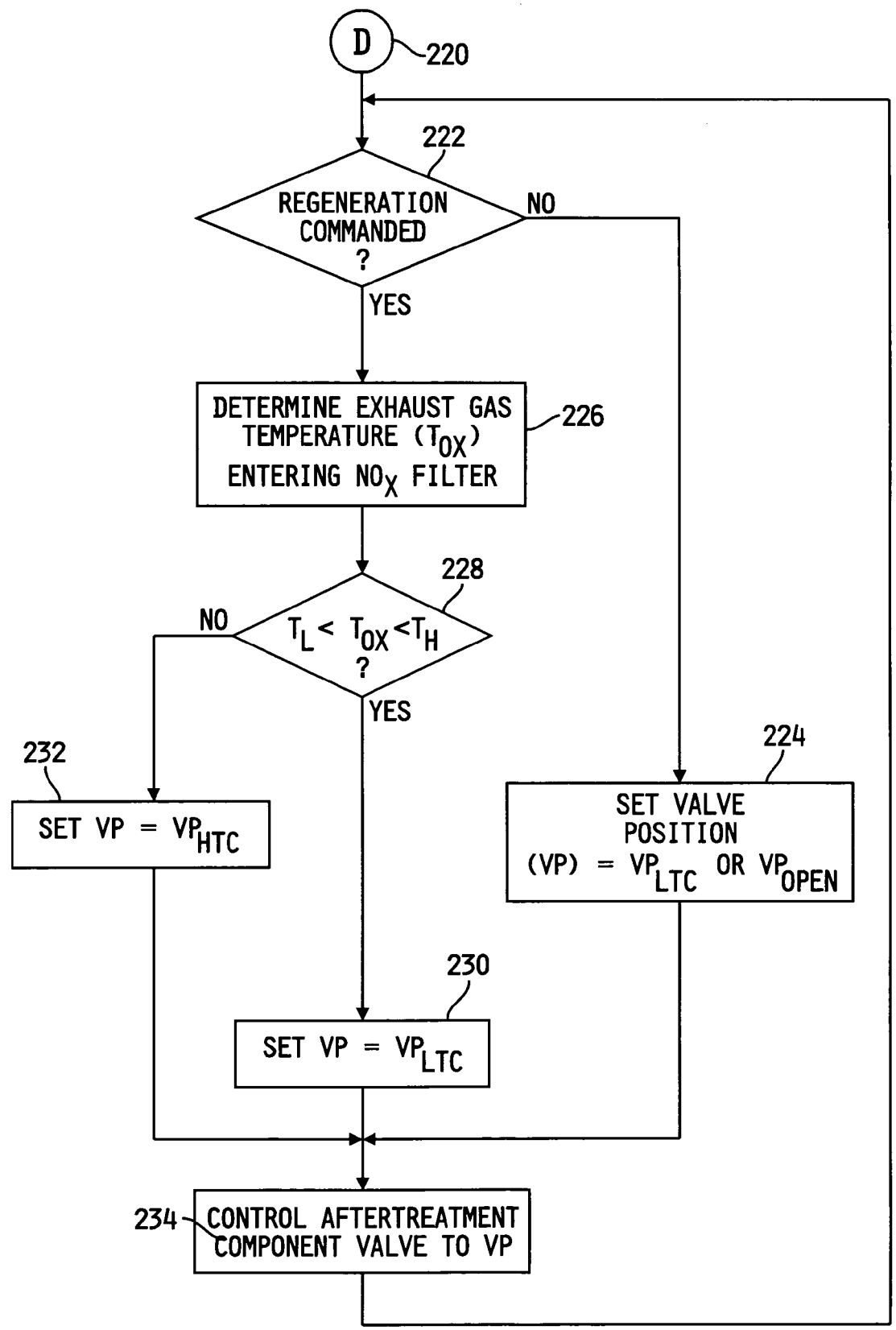
FIG. 9 is a flowchart of one illustrative software algorithm for controlling operation of the NOx aftertreatment device of FIG. 1.

Referring now to FIG. 9, a flow chart is shown of one illustrative software algorithm 220 for controlling operation of the NOx aftertreatment device 28 of FIGS. 1 and 4A-5. The algorithm 220 sets forth a process for controlling the NOx aftertreatment device 28 in a manner that provides for selective regeneration of either of two NOx aftertreatment elements 100 and 102, and in this sense the algorithm 220 is applicable to control operation of the NOx aftertreatment device 28 in embodiments of the system 10 that includes only a conventional diesel oxidation catalyst or in embodiments of the system 10 that include the diesel oxidation catalyst 26 described herein. The software algorithm 220 is stored in the memory unit 34 in the form of one or more conventional software programs and is executed by the control circuit 32 in a conventional manner. The algorithm 220 begins as step 222 where the control circuit 32 is operable to determine whether regeneration of the NOx aftertreatment device 28 has been commanded. In one embodiment, the control circuit 32 is operable to control the regeneration times of aftertreatment components, and therefore has knowledge of whether regeneration of the NOx aftertreatment device 28 has been commanded. Additionally or alternatively, the control circuit 32 may be operable at step 222 to determine whether regeneration of the NOx aftertreatment device 28 has been commanded by monitoring temperature of the exhaust gas entering the NOx aftertreatment device 28 using any of the techniques described hereinabove. If the temperature of exhaust gas entering the NOx aftertreatment device 28 is sufficiently high, this indicates that the diesel oxidation catalyst is heating the exhaust gas in preparation for regeneration of the NOx aftertreatment device 28. In any case, if the control circuit 32 determines at step 222 that regeneration of the NOx aftertreatment device 28 has not been commanded, algorithm execution advances to step 224 wherein the control circuit 32 is operable in one embodiment to set the valve position value, VP, to an open position, $VP_{OPEN}$. In the embodiment illustrated in FIG. 5, the $VP_{OPEN}$ valve position corresponds to the valve position 120. In any case, the catalyst valve position $VP_{OPEN}$ corresponds to a position of the valve or other exhaust gas flow control mechanism 112 of the NOx aftertreatment device 28 that directs exhaust gas flowing into the inlet of the NOx aftertreatment device 28 to the outlet of the NOx aftertreatment device 28 via both of the fluid passageways 94 and 96. With the valve or other exhaust gas flow control mechanism 112 in this position, exhaust gas accordingly flows through both of the NOx aftertreatment elements 100 and 102. In an alternative embodiment, the control circuit 32 may be operable at step 224 to set the valve position value, VP, to a low temperature position, $V_{LTC}$ (or alternatively still to a high temperature position, $V_{HTC}$), wherein $V_{LTC}$ corresponds to the valve position 124 and $V_{HTC}$ corresponds to the valve position 122.

If, at step 222, the control circuit 32 determines that regeneration of the NOx aftertreatment device 28 has been commanded, execution of the algorithm 220 advances to step 226 where the control circuit 32 is operable to determine the temperature, $T_{OX}$, of the exhaust gas flowing into the inlet of the NOx aftertreatment device 28 using any one or more of the techniques described hereinabove. Thereafter at step 228, the control circuit 32 is operable to determine whether $T_{OX}$ is in a range that is greater than a low temperature value, $T_L$, and less than a high temperature value, $T_H$. As described hereinabove, the peak oxidation efficiency of the NOx aftertreatment element 100 is different than that of the NOx aftertreatment element 102, and in the illustrated embodiment of the algorithm 222 $T_L$ and $T_H$ are chosen to correspond to a temperature range at or near the NOx aftertreatment element having a peak oxidation efficiency in the lowest temperature range. If, at step 228, the control circuit 32 determines that $T_{OX}$ is between $T_L$ and $T_H$, algorithm execution advances to step 230 where the control circuit 32 is operable to set the valve position value, VP, to a low temperature valve position value, $V_{LTC}$. In the embodiment illustrated in FIG. 5, the NOx aftertreatment element having a peak oxidation efficiency in the lowest temperature range is the aftertreatment element 102, and the $VP_{LTC}$ position in this embodiment corresponds to the position 124 of the valve or other exhaust flow control mechanism 112 of the NOx aftertreatment device 28. In an alternative embodiment, the NOx aftertreatment element having a peak oxidation efficiency in the lowest temperature range may the aftertreatment element 100, and the $VP_{LTC}$ position in this embodiment accordingly corresponds to the position 122 of the valve or other exhaust flow control mechanism 112 of the NOx aftertreatment device 28. In any case, the catalyst valve position $VP_{LTC}$ corresponds to a position of the valve or other exhaust gas flow control mechanism 112 of the NOx aftertreatment device 28 that directs exhaust gas flowing into the inlet of the NOx aftertreatment device 28 to the outlet of the diesel oxidation catalyst device 26 via the NOx aftertreatment element having peak oxidation efficiency in the lowest temperature range.

If, at step 228, the control circuit 32 determines that $T_{OX}$ is not between $T_L$ and $T_H$, algorithm execution advances to step 232 where the control circuit 32 is operable to set the valve position value, VP, to a high temperature valve position value, $V_{HTC}$. In the embodiment illustrated in FIG. 5, the NOx aftertreatment element having a peak oxidation efficiency in the highest temperature range is the aftertreatment element 100, and the $VP_{HTC}$ position in this embodiment corresponds to the position 122 of the valve or other exhaust flow control mechanism 112 of the NOx aftertreatment device 28. In an alternative embodiment, the NOx aftertreatment element having a peak oxidation efficiency in the highest temperature range may the aftertreatment element 102, and the $VP_{HTC}$ position in this embodiment accordingly corresponds to the position 124 of the valve or other exhaust flow control mechanism 112 of the NOx aftertreatment device 28. In any case, the catalyst valve position $VP_{HTC}$ corresponds to a position of the valve or other exhaust gas flow control mechanism 112 of the NOx aftertreatment device 28 that directs exhaust gas flowing into the inlet of the NOx aftertreatment device 28 to the outlet of the diesel oxidation catalyst device 26 via the NOx aftertreatment element having peak oxidation efficiency in the highest temperature range. In the illustrated embodiment, $T_L$ and $T_H$ are chosen so that if $T_{OX}$ is between $T_L$ and $T_H$, this indicates that the temperature of the exhaust gas entering the NOx aftertreatment device 28 is closer to the temperature range of the NOx aftertreatment element having peak oxidation efficiency in the lowest temperature range, and that if $T_{OX}$ is not between $T_L$ and $T_H$, this indicates that the temperature of the exhaust gas entering the NOx aftertreatment device 28 is closer to the temperature range of the NOx aftertreatment element having peak oxidation efficiency in the highest temperature range.

Following any of steps 224, 230 and 232, execution of the algorithm 220 advances to step 234 where the control circuit 32 is operable to control the valve or other exhaust gas flow control mechanism 112 of the NOx aftertreatment device 28 to VP. Thereafter, algorithm execution loops back to step 222 for continual execution of the algorithm 220.

From the foregoing, it should be apparent that the control circuit 32 is operable under the direction of the software algorithm 220 to route the exhaust gas through the NOx aftertreatment element having peak oxidation efficiency in a lower temperature range when the temperature of exhaust gas entering the NOx aftertreatment device 28 is within or closer to this lower temperature range, and to route the exhaust gas through the NOx aftertreatment element having peak oxidation efficiency in a relatively higher temperature range when the temperature of the exhaust gas entering the NOx aftertreatment device 28 is within or closer to this higher temperature range.

It will be understood that while four separate algorithms have been illustrated and described herein, the present disclosure contemplates that the control circuit 32 may be configured to execute any single one or combination of these algorithms at any time to thereby achieve one or more desired exhaust gas flow goals. It will further be understood that while the various structural and control process concepts described herein were set forth in the context of a diesel oxidation catalyst device 26 and in the context of a NOx aftertreatment device 28, those skilled in the art will recognize that any such structural and/or control process concepts may also be applied to any one or more other exhaust gas aftertreatment devices. For example, the exhaust braking concepts and control techniques described herein and particularly with respect to FIGS. 6 and 7 may alternatively or additionally applied to a diesel particulate filter such as the diesel particulate filter 30 illustrated in FIG. 1. As another example, the dual aftertreatment element concepts and control techniques described herein with respect to the NOx aftertreatment device 28 may alternatively or additionally be applied to a diesel oxidation catalyst device such as the diesel oxidation catalyst device 26 illustrated herein and/or to a diesel particulate filter such as the diesel particulate filter 30 illustrated in FIG. 1. As one specific example, the diesel oxidation catalyst device 26 may include a second diesel oxidation catalyst element within the passageway 96 (see FIG. 3), wherein the first diesel oxidation catalyst element 98 defines a peak oxidation conversion efficiency in a first range of exhaust gas temperatures, and the second diesel oxidation catalyst element defines a peak oxidation conversion efficiency in a second range of exhaust gas temperatures different than the first range of exhaust gas temperatures. As another specific example, the diesel particulate filter 30 may likewise be provided with two diesel particulate filter elements, wherein first diesel particulate filter element defines a peak particulate conversion efficiency in a first range of exhaust gas temperatures, and the second diesel particulate filter element defines a peak particulate conversion efficiency in a second range of exhaust gas temperatures different than the first range of exhaust gas temperatures.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An exhaust gas aftertreatment device for an internal combustion engine, the device comprising:
   an inlet configured to receive the exhaust gas,
   an outlet from which the exhaust gas exits the device,
   a first passageway defined between the inlet and the outlet,
   a first aftertreatment element disposed in the first passageway, the first aftertreatment element defining a peak conversion efficiency in a first range of exhaust gas temperatures,
   a second passageway defined between the inlet and the outlet and separated from the first passageway,
   a second aftertreatment element disposed in the second passageway, the second aftertreatment element defining a peak conversion efficiency in a second range of exhaust gas temperatures different than the first range, and
   an exhaust gas flow control mechanism configured to selectively control exhaust gas flow through the first and second passageways.

2. The device of claim 1 wherein the exhaust gas aftertreatment device is a diesel oxidation catalyst device,
   and wherein the first and second aftertreatment elements are first and second diesel oxidation catalyst elements respectively,
   and wherein the first diesel oxidation catalyst element defines a peak oxidation conversion efficiency in the first range of exhaust gas temperatures and the second diesel oxidation catalyst element defines a peak oxidation conversion efficiency in the second range of exhaust gas temperatures.

3. The device of claim 2 further comprising an exhaust manifold coupled to the engine, the exhaust gas exiting the engine via the exhaust manifold,
   wherein the inlet of the housing is positioned adjacent to the exhaust manifold.

4. The device of claim 2 further comprising an exhaust manifold coupled to the engine, the exhaust gas exiting the engine via the exhaust manifold,
   wherein the inlet of the housing is positioned remote from the exhaust manifold.

5. The device of claim 4 further comprising another exhaust gas aftertreatment device having an inlet receiving the exhaust gas exiting the diesel oxidation catalyst device,
   wherein the outlet of the housing is positioned adjacent to the inlet of the another exhaust aftertreatment component.

6. The device of claim 1 wherein the exhaust gas aftertreatment device is a NOx aftertreatment device,
   and wherein the first and second aftertreatment elements are first and second NOx aftertreatment elements respectively,
   and wherein the first NOx aftertreatment element defines a peak NOx conversion efficiency in the first range of exhaust gas temperatures and the second NOx aftertreatment element defines a peak NOx conversion efficiency in the second range of exhaust gas temperatures.

7. The device of claim 1 wherein the exhaust gas flow control mechanism is controllable to direct exhaust gas flow from the inlet of the housing to the first passageway while blocking exhaust gas flow from the inlet of the housing to the second passageway.

8. The device of claim 1 wherein the exhaust gas flow control mechanism is controllable to direct exhaust gas flow from the inlet of the housing to the second passageway while blocking exhaust gas flow from the inlet of the housing to the first passageway.

9. The device of claim 1 wherein the exhaust gas flow control mechanism is controllable to direct exhaust gas flow from the inlet of the housing to both of the first and second passageways.

10. The device of claim 1 wherein the exhaust gas flow control mechanism is controllable to selectively block exhaust gas flow from the inlet of the housing to both of the first and second passageways.

11. The device of claim 1 further comprising a control circuit configured to control operation of the exhaust gas flow control mechanism.

12. The device of claim 11 wherein the control circuit is configured to control the exhaust gas flow control mechanism to direct exhaust gas flow from the inlet to the first passageway while blocking exhaust gas flow from the inlet to the second passageway if regeneration of the NOx aftertreatment device is commanded and if the exhaust gas temperature is closer to the first range of exhaust gas temperatures than to the second range of exhaust gas temperatures.

13. The device of claim 11 wherein the control circuit is configured to control the exhaust gas flow control mechanism to direct exhaust gas flow from the inlet to the second passageway while blocking exhaust gas flow from the inlet to the first passageway if regeneration of the NOx aftertreatment device is commanded and if the exhaust gas temperature is closer to the second range of exhaust gas temperatures than to the first range of exhaust gas temperatures.

14. The device of claim 11 wherein the control circuit is configured to control the exhaust gas flow control mechanism to direct exhaust gas flow from the inlet to both of the first and second passageways if regeneration of the NOx aftertreatment device is not commanded.

15. The device of claim 1 wherein the exhaust gas flow control mechanism includes an exhaust gas flow control valve positioned near the inlet of the housing.

16. The device of claim 1 further comprising a housing defining the inlet, the outlet and the first and second passageways between the inlet and the outlet,
and wherein the exhaust gas flow control mechanism is positioned within the housing.

17. A system for controlling an exhaust gas aftertreatment device for an internal combustion engine comprising an inlet configured to receive the exhaust gas, an outlet from which the exhaust gas exits the device, a first passageway defined between the inlet and the outlet, a first aftertreatment element disposed in the first passageway, a second passageway defined between the inlet and the outlet and separated from the first passageway, and an exhaust gas flow control mechanism configured to selectively control exhaust gas flow through the first and second passageways, the system comprising:
an exhaust brake enabling switch having an on position and an off position,
means for producing an exhaust brake activation parameter, and
a control circuit is configured to control the exhaust gas flow control mechanism to restrict exhaust gas flow to both of the first and second passageways if the exhaust brake enabling switch is in the on position and the exhaust brake activation parameter indicates that the exhaust brake should be activated.

18. The system of claim 17 wherein the exhaust brake activation parameter is a throttle percentage value corresponding to a percentage, relative to a maximum, of requested engine fueling, the throttle percentage value indicating that the engine brake should be activated if the throttle percentage value corresponds to zero percent requested fueling.

19. The system of claim 17 further comprising at least one exhaust brake level switch producing an exhaust brake level signal indicative of a requested level of exhaust braking, the control circuit responsive to the exhaust brake level signal to control the operation of the exhaust gas flow control mechanism to produce a corresponding level of exhaust braking.

20. A system for controlling an exhaust gas aftertreatment device for an internal combustion engine comprising an inlet configured to receive the exhaust gas, an outlet from which the exhaust gas exits the device, a first passageway defined between the inlet and the outlet, a first aftertreatment element disposed in the first passageway, a second passageway defined between the inlet and the outlet and separated from the first passageway, and an exhaust gas flow control mechanism configured to selectively control exhaust gas flow through the first and second passageways, the system comprising:
a service brake including a service brake pedal responsive to operator actuation to apply a braking force to at least one wheel of a vehicle carrying the system,
a service brake sensor producing a service brake request level signal indicative of a force applied to the service brake pedal,
a vehicle speed sensor producing a vehicle speed signal indicative of road speed of the vehicle, and
a control circuit responsive to the vehicle speed signal to compute a vehicle acceleration value, the control circuit configured to control the exhaust gas flow control mechanism to restrict exhaust gas flow to both of the first and second passageways as a function of the service brake request level signal and the vehicle acceleration value.

21. The system of claim 20 further comprising an exhaust brake enabling switch having an on position and an off position, the control circuit configured to control the exhaust gas flow control mechanism to restrict exhaust gas flow to both of the first and second passageways only if the exhaust brake enabling switch is in the on position.

22. The system of claim 20 further comprising a memory unit having the function stored therein, the function defining a relationship between the service brake request level signal, the vehicle acceleration value and an amount of exhaust gas flow restriction, the amount of exhaust gas flow restriction increasing with decreasing vehicle acceleration values and increasing service brake request levels, the control circuit controlling the exhaust gas flow control mechanism based on the amount of exhaust flow restriction produced by the function.

23. The system of claim 22 wherein the function is stored in the memory unit in the form of a table mapping vehicle acceleration values and service brake request level signal values to amounts of exhaust gas flow restriction.

24. A diesel oxidation catalyst device comprising:
a housing defining an inlet configured to receive exhaust gas produced by an internal combustion engine, an outlet from which the exhaust gas exits the device,
a first passageway defined within the housing between the inlet and the outlet,
a diesel oxidation catalyst element disposed in the first passageway and defining a flow restriction in the first passageway,
a second passageway defined within the housing between the inlet and the outlet, the second passageway separate from the first passageway and devoid of flow restriction, the first and second passageways defining the only flow passageways through the housing so that exhaust gas flowing through the device must flow through at least one of the first and second passageways, and
an exhaust gas flow control mechanism positioned within the housing and controllable to a first position that restricts exhaust gas flow from the inlet through both of the first and second passageways.

25. The device of claim 24 wherein the exhaust gas flow control mechanism is controllable to a second position that directs exhaust gas flow from the inlet through the first passageway while blocking exhaust gas flow from the inlet through the second passageway.

26. The device of claim 25 wherein the exhaust gas flow control mechanism is controllable to a third position that directs exhaust gas flow from the inlet through the second passageway while blocking exhaust gas flow from the inlet through the first passageway.

27. The device of claim 26 wherein the exhaust gas flow control mechanism is controllable between the second and third positions to selectively direct exhaust gas flow from the inlet through both of the first and second passageways.

28. The device of claim 26 further comprising a control circuit configured to control the position of the exhaust gas flow control mechanism.

29. The device of claim 28 further comprising
at least one exhaust aftertreatment component receiving exhaust gas exiting the outlet of the diesel oxidation catalyst device, and
means for determining an exhaust gas temperature corresponding to the temperature of exhaust gas entering the device,
wherein the control circuit is configured to control the exhaust gas flow control mechanism to the first position if regeneration of the at least one exhaust aftertreatment component is commanded and if the exhaust gas temperature is less than a threshold temperature.

30. The device of claim 29 wherein the control circuit is configured to control the exhaust gas flow control mechanism to the second position if regeneration of the at least one exhaust aftertreatment component is commanded and the exhaust gas temperature is greater than the threshold temperature.

31. The device of claim 29 wherein the control circuit is configured to control the exhaust gas flow control mechanism to the third position if regeneration of the at least one exhaust aftertreatment component is not commanded.

* * * * *